(No Model.)
E. BOURNE.
KITCHEN RANGE HOT WATER RESERVOIR.
No. 260,738. Patented July 11, 1882.
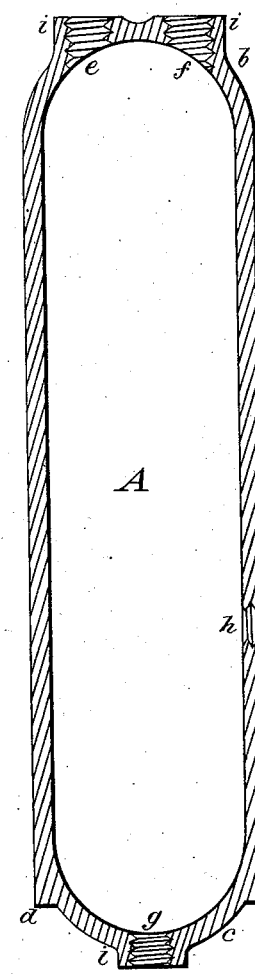
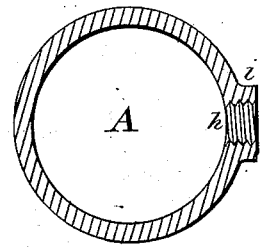
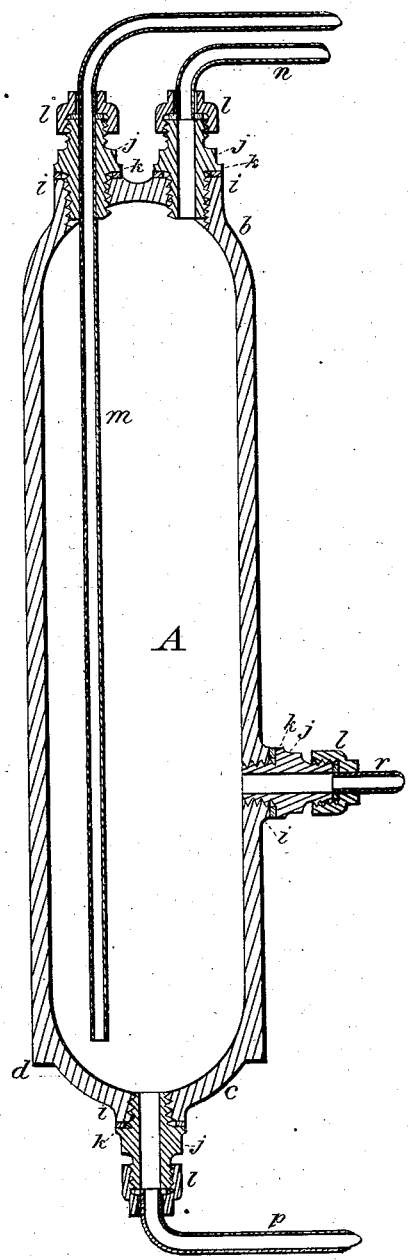
Witnesses.
Jonathan Ord.
A. H. Price
Inventor.
Edward Bourne.
Josiah W. Ells
Attorney.

UNITED STATES PATENT OFFICE.

EDWARD BOURNE, OF ALLEGHENY, PENNSYLVANIA.

KITCHEN-RANGE HOT-WATER RESERVOIR.

SPECIFICATION forming part of Letters Patent No. 260,738, dated July 11, 1882.

Application filed April 6, 1882. (No model.)

*To all whom it may concern:*

Be it known that I, EDWARD BOURNE, a citizen of the United States, residing in Allegheny city, in the county of Allegheny and State of Pennsylvania, have invented a new and useful Improvement in Kitchen-Range Hot-Water Reservoirs, which invention will be readily understood from the following description, taken in connection with the accompanying drawings, wherein—

Figure 1 represents a sectional and central elevation of my improved reservoir; Fig. 2, a transverse section of the same through the center of the side opening; Fig. 3, a sectional and central elevation of the reservoir and its immediate pipe-connections.

My invention relates to that class of close steam-tight reservoirs generally located a short distance from and used in conjunction with kitchen-ranges for holding and keeping in readiness a supply of water made hot by circulating through the back wall of a fire-place. Heretofore such reservoirs have been constructed of metal, sometimes of cast-iron, but more generally of sheet-copper or wrought-iron, either brazed or riveted together, requiring considerable skill and labor in their formation, and when so made and put to use are a source of great trouble and inconvenience, owing to the constant oxidation of the interior surface, which cannot be got at to clean, and where a copper reservoir is used the water, if allowed to stand for any time, soon becomes unwholesome, and, in fact, highly injurious, by being heated in contact with cupreous oxide, and where iron reservoirs are used the formation of rust is so rapid as to strongly impregnate the water, giving it a yellowish tinge and muddy appearance, unfitting it for culinary or washing purposes.

My invention is designed to do away with metallic reservoirs for kitchen use by substituting therefor a cheap, strong, and durable non-corrosive steam-tight vessel that cannot under any circumstances contaminate the water or cause therein any impurity, and from which it may be drawn as clean and clear as when it first entered. To this end I construct a hot-water reservoir of terra-cotta or analogous material, and combine therewith all or any of the appliances necessary to make the same effective when attached to a range for domestic purposes. This reservoir may be of any form, but must consist wholly, entirely, and completely of argillaceous material, molded or fashioned into shape, and glazed inside and outside, and burned to the requisite degree of vitrification in any manner, or by any means known to the art. I prefer, however, to make the body A of the vessel cylindrical, with concavo-convex or dome-shaped ends $b$ $c$, and of a uniform thickness throughout, and strong enough to successfully withstand the pressure of water and limited force of steam. The protuberant bottom $c$ is somewhat less in diameter than the exterior of the cylinder A, thus forming a flat circular seat, $d$, all around, upon which the vessel may stand, vertically supported in an iron ring or frame.

This reservoir is provided with four openings for the attachment of suitable inlet and outlet pipes, two, $e$ $f$, of which are located in and extend through the top; one, $g$, through the center of the bottom $c$, and the other, $h$, through the side of the vessel, around each of which is a short, stout, projecting boss, $i$, consisting of an extra thickness of material integral with the walls of the reservoir, giving increased strength to the immediate parts. Each of the said openings is provided with a coarse slightly-tapering screw-thread, formed or molded in the plastic material of which the reservoir is composed during the process of its construction, by means of a properly-shaped wooden or other plug, that is allowed to remain in place until the plastic material of which the vessel is composed has become sufficiently dry to allow its safe removal, and is then withdrawn preparatory to applying the glazing compound, and before heating, to vitrify the same.

To make the pipe-connections, a short tubular metallic spud, $j$, having a screw thereon corresponding to that in either of the openings, is screwed into each of them until its collar $k$ forces an intervening gum gasket closely against the face of its respective boss, thus making a perfectly-tight joint.

On the outer end of each spud $j$ is a smaller and finer screw, by which a pipe may be made fast by means of a screw-cap, $l$, after the manner commonly in use for such purposes, and of which no particular description is herein deemed necessary. As usual in cases of this kind, that pipe, m, extending through the top and down nearly to the bottom of the reservoir is known as the "supply-pipe," having connection with the street-main by which the requisite quantity of water is furnished, and the pipe n beside it, terminating just below the dome, is the one through which hot water may be forced and distributed to various parts of the house. The pipe p, leading from the center of the bottom c, conveys cold water to the hollow iron back of a fire-place; and the pipe r, entering the side of the reservoir, is the one by which it returns after being made hot, thus keeping up a continual circulation.

I am aware that the above-mentioned arrangement of pipes is not new, and also that argillaceous material has heretofore been used in the manufacture of hot-water reservoirs. I therefore do not claim such arrangement or use, broadly.

I claim—

The earthenware reservoir A, formed with the tapering internally screw-threaded inlet and outlet orifices $e\,f\,g\,h$, in combination with the metallic spuds $j$, formed with threads on their inner ends to register with and fit into said orifices $e\,f\,g\,h$, and provided with smaller threads on their outer ends, adapted to connect with the service-pipes, as shown and described.

EDWARD BOURNE.

Witnesses:
JOSIAH W. ELLS,
A. H. PRICE.